(No Model.)

A. L. GORDON.
SOD GROUND PULVERIZER.

No. 316,141. Patented Apr. 21, 1885.

WITNESSES:
Chas. Nida
C. Sedgwick

INVENTOR:
A. L. Gordon
BY Munn & Co
ATTORNEYS.

UNITED STATES PATENT OFFICE.

ABIJAH L. GORDON, OF HELIX, OREGON.

SOD-GROUND PULVERIZER.

SPECIFICATION forming part of Letters Patent No. 316,141, dated April 21, 1885.

Application filed August 9, 1884. (No model.)

*To all whom it may concern:*

Be it known that I, ABIJAH L. GORDON, of Helix, in the county of Umatilla and State of Oregon, have invented certain new and useful Improvements in Sod-Ground Pulverizers, of which the following is a full, clear, and exact description.

Reference is to be had to the accompanying drawings, forming part of this specification, in which similar letters of reference indicate corresponding parts in both the figures.

Figure 1:
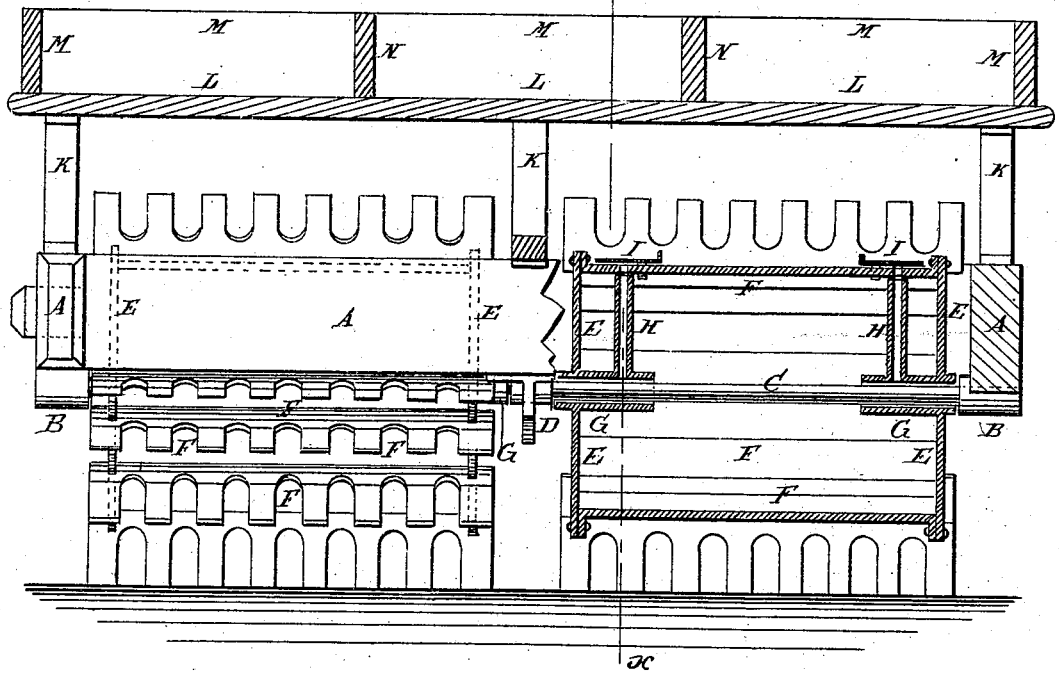
Figure 2:
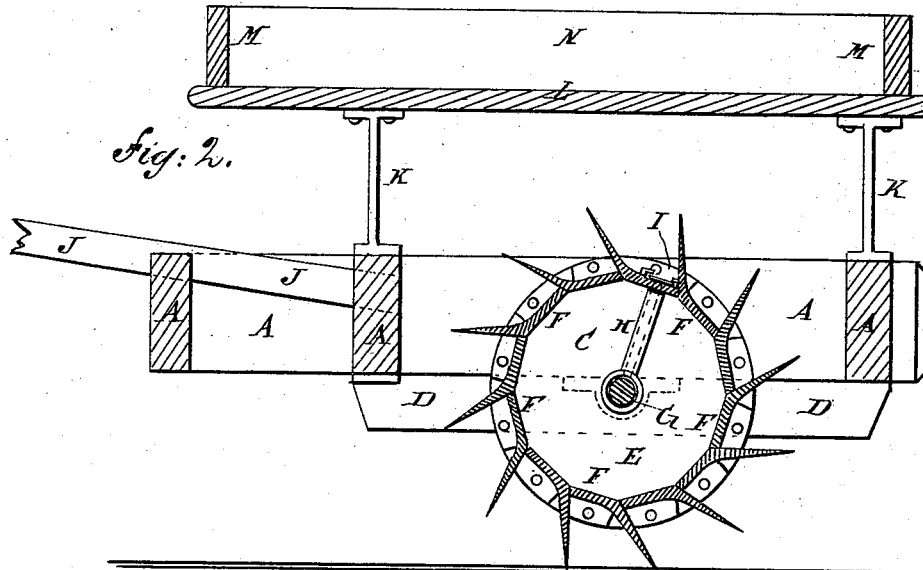

Figure 1 is a rear elevation of my improvement, partly in section. Fig. 2 is a sectional side elevation of the same, taken through the line *x x*, Fig. 1.

The object of this invention is to facilitate the pulverizing of sod-ground and promote thoroughness in such pulverizing.

The invention consists in a pulverizer constructed with a frame provided with a shaft carrying two cylinders having tapered and scalloped digging-flanges.

The cylinders are made with disks having long hubs revolving upon a shaft, the said disks being connected in pairs by plates having inclined tapered and scalloped digging-flanges, whereby sods will be cut and torn in pieces without being turned or raised from their places. With perforations in the sides of the hubs are connected tubes extending nearly to the flanged digging-plates and terminating directly opposite apertures in the said plates, which apertures are covered with slides, so that the cylinder-bearings can be readily oiled and dust and soil excluded.

To the pulverizer-frame are attached standards carrying a platform provided with side and end boards and divided into central and side compartments by partitions, whereby the driver will be protected from dust and soil and the pulverizer can be readily weighted, as will be hereinafter fully described.

A represents the frame of the machine, to the lower edge of the side bars of which are attached bearings B, to receive and hold the ends of the shaft C. The middle part of the shaft C is supported by a bearing, D, the ends of which are attached to the centers of the lower sides of the rear and middle cross-bars of the frame A.

Upon the shaft C are placed two pulverizing-cylinders, each of which is formed of two disks, E, connected by a series of flanged plates, F. The disks E are made with long hubs G, to give them long bearings upon the shaft C. The parts of the plates F that form the body of the cylinder have end lugs, which are perforated to receive the bolts or rivets that secure the said plates to the disks E, as shown in Figs. 1 and 2. The forward parts of the plates F incline outward at such an angle that the flanges thus formed will be tangent to an imaginary cylinder about six inches in diameter, and having its axis in the axis of the shaft C. With this inclination the flanges of the plates F will enter the ground nearly vertically, and as they rise from the ground will tear the sods in pieces without turning them or raising them out of their places. The flanges of the plates F are tapered to an edge, as shown in Fig. 2, and are scalloped, as shown in Fig. 1, the scallops being about two inches wide and the cutting-sections left between the scallops being also about two inches wide.

In the apertures in the inner parts of each of the hubs G is secured the inner end of a tube, H, the outer end of which projects nearly to the plate F, which plate is perforated directly opposite the outer end of the said tube, so that the bearings of the cylinder can be lubricated by oil introduced through the aperture in the plate F and through the tube H.

The apertures in the plates F are covered by slides I, secured to the said plates to prevent the apertures and tubes from becoming clogged with dust and soil.

To the forward and middle cross-bars of the frame A is attached the tongue J, to which the draft is applied, and by means of which the pulverizer is guided and controlled.

To the frame A are attached short standards K, to the upper ends of which is attached a platform, L.

The platform L is provided with low side and end boards, M, and the space thus inclosed is divided into three compartments by partitions *n*, the central compartment being designed to receive the driver's seat, which is not shown in the drawings, so that the driver will be protected from dust and soil, and the side compartments being designed to receive stones or other heavy substance to weight the pulverizer as the character of the soil may require.

Having thus described my invention, I claim as new and desire to secure by Letters Patent—

In a pulverizer, the combination, with the frame A and the shaft C, of the pairs of disks E, having long hubs G, and the sets of plates F, each having an inclined tapered and scalloped flange forming a series of broad pointed teeth, substantially as herein shown and described, whereby sods will be cut and torn in pieces without being turned or raised from their places, as set forth.

ABIJAH L. GORDON.

Witnesses:
J. H. PARKES,
R. SARGENT.